(12) United States Patent
Kitane et al.

(10) Patent No.: US 7,885,434 B2
(45) Date of Patent: Feb. 8, 2011

(54) BIOMETRIC INFORMATION AUTHENTICATION DEVICE AND METHOD

(75) Inventors: Keiji Kitane, Ebina (JP); Yasushi Aoyama, Yokohama (JP); Harumi Satou, Sagamihara (JP); Shuichi Uchiyama, Ebina (JP)

(73) Assignee: Hitachi, Ltd., Tokyo (JP)

( * ) Notice: Subject to any disclaimer, the term of this patent is extended or adjusted under 35 U.S.C. 154(b) by 998 days.

(21) Appl. No.: 11/724,767

(22) Filed: Mar. 16, 2007

(65) Prior Publication Data

US 2007/0230753 A1 Oct. 4, 2007

(30) Foreign Application Priority Data

Mar. 31, 2006 (JP) .............................. 2006-096407

(51) Int. Cl.
G06K 9/00 (2006.01)
G06K 9/68 (2006.01)

(52) U.S. Cl. ........................ 382/115; 382/124; 382/218; 340/5.53

(58) Field of Classification Search ................. 382/115, 382/124, 125, 100, 181, 209, 217, 218, 207, 382/206, 201, 280, 291, 278, 266, 199; 340/5.1, 340/5.8, 5.81, 5.82, 5.83, 5.52, 5.53; 713/186; 726/17, 26; 235/380, 382, 454; 702/19
See application file for complete search history.

(56) References Cited

U.S. PATENT DOCUMENTS 5,933,546 A * 8/1999 Stone ......................... 382/278
6,574,366 B1 * 6/2003 Fan ............................ 382/201
6,813,010 B2 11/2004 Kono
6,898,301 B2 * 5/2005 Iwanaga ..................... 382/124
7,245,745 B2 * 7/2007 Nagasaka et al. ........... 382/115
7,474,769 B1 * 1/2009 McAfee et al. .............. 382/115
7,680,305 B2 * 3/2010 Miura et al. ................. 382/115
2005/0177314 A1 * 8/2005 Rajagopal et al. ............. 702/19
2008/0075330 A1 * 3/2008 Matsumura et al. ......... 382/115

FOREIGN PATENT DOCUMENTS

JP 2002-092616 3/2002
JP 2005-128936 5/2005

* cited by examiner

Primary Examiner—Sheela C Chawan
(74) Attorney, Agent, or Firm—Townsend and Townsend and Crew LLP

(57) ABSTRACT

At least one wrong template for storing features of pattern information imaged on condition unsuitable for biometric authentication is provided and the wrong template information is collated with collation template information produced by extracting features from biometric information when authentication information is registered. When similarity is low, the collation template information is stored in an authentication template. The collation template is collated with the wrong template upon authentication and when similarity is high, authentication processing is not made. Further, when similarity of the collation template information and the wrong template information is high, a guidance message for solving a problem is displayed to the user. Thus, reduction of authentication performance is prevented.

20 Claims, 10 Drawing Sheets

BIOMETRIC INFORMATION AUTHENTICATION DEVICE AND METHOD

CROSS-REFERENCE TO RELATED APPLICATION

This application claims priority from Japanese Patent Application JP 2006-096407, filed on Mar. 31, 2006, the content of which is hereby incorporated by reference into this application.

BACKGROUND OF THE INVENTION

The present invention relates to a biometric authentication device and more particularly to improvement in an authentication rate of the authentication device that authenticates authentication information of a vein pattern.

Recently, with the spread of information processing apparatuses such as personal computers (PC), there is a problem that the apparatus passes into malicious third party's hands due to robbery or loss, so that information stored in the personal computer leaks out. Further, a financial agency has a problem that a cash card is used illegally. Accordingly, it is desired to make individual authentication of a user of the cash card and the information processing apparatus such as personal computer.

There are many kinds of individual authentication techniques, although attention is particularly paid to the authentication technique using biometric information of a user as authentication information. The vein authentication technique utilizing, for example, a vein pattern can realize safer and handy biometric authentication devices. Among them, the authentication device using a vein pattern of a finger can be made smaller as compared with other vein authentication devices using the palm or the like and can be incorporated into various information apparatuses.

JP-A-2002-092616 (corresponding to U.S. Pat. No. 6,813,010 discloses a finger vein authentication technique utilizing a vein pattern of a finger, particularly an individual authentication device utilizing those, in which an amount of light emitted from a light source is optimized on the basis of an imaged picture of finger and a vein pattern is subjected to emphasis processing in the arithmetic operation of picture for authentication.

Further, JP-A-2005-128936 discloses an example of a finger vein authentication device in which a finger is naturally guided to a specific position so that an imaged picture can be subjected to stable collation requiring no correction of positioning and rotation and the authentication accuracy can be improved to have no lack of vein pattern due to pressure on finger.

SUMMARY OF THE INVENTION

The finger vein authentication technique makes authentication by collation of a previously registered vein pattern for reference information of authentication with a vein pattern imaged at the time of authentication. In general, the authentication rate is represented by a numerical value such as a rejection rate of a user himself and an acceptance rate of others. The authentication rate is influenced by the accuracy of the registered vein pattern and the reproducibility of the imaged vein pattern. JP-A-2002-092616 and JP-A-2005-128936 disclose examples of solution measures thereof.

The authentication device is made smaller with the spread of apparatuses to which the finger vein authentication device is applied, so that use surroundings are expanded and users are increased. Accordingly, improvement in accuracy of the vein pattern is required while coping with change in use surroundings and operation situation different from the prior art.

Further, since the vein authentication technique makes authentication by means of the imaged vein pattern, there is a possibility that secrecy is reduced when the vein pattern is displayed on a picture screen. Accordingly, there is a problem that the user cannot confirm whether imaging is performed satisfactorily or not on the picture screen and the operability is bad.

It is an object of the present invention to provide an authentication device and method that can image a vein pattern with high accuracy and reproducibility upon registration and authentication of the vein pattern.

In order to solve the problems, the biometric information authentication device according to the present invention comprises a pattern imaging part for acquiring biometric information as pattern information, a feature data extraction part for extracting features from the pattern information acquired by the pattern imaging part to produce template information, an authentication template for storing template information for reference of biometric authentication, at least one wrong template for storing features of pattern information imaged on condition unsuitable for biometric authentication, registration means of the authentication template in which collation template information produced by extracting features from pattern information acquired by the pattern imaging part by the feature data extraction part is stored when similarity of the collation template information and wrong template information stored in the wrong template is calculated and any of the similarity is low than a first predetermined judgment threshold, and authentication means for calculating similarity of the collation template information and the authentication template and comparing the similarity with a second predetermined judgment threshold to make authentication when similarity of the collation template information produced by extracting features from pattern information acquired by the pattern imaging part by the feature data extraction part and the wrong template information stored in the wrong template is calculated and any of the similarity is lower than the first predetermined judgment threshold.

Further, indication that effective collation template is produced and a guidance message corresponding to the wrong template are displayed.

According to the present invention, since authentication processing using vein pattern degraded due to external disturbance and scattered operation can be removed upon registration of vein pattern for authentication or upon imaging of vein pattern in authentication processing, handling by user can be improved and there can be provided the authentication device and method with high authentication rate.

Further, since a discard template may be prepared in accordance with use surroundings, there can be provided the authentication device and method with high availability.

Moreover, since the user can confirm the authentication processing situation upon authentication and when wrong operation is made, a coping method can be indicated, there can be provided the authentication device and method with excellent handling.

BRIEF DESCRIPTION OF THE DRAWINGS

FIG. 6 is a schematic diagram illustrating an imaging situation in case where external light streams in;

DESCRIPTION OF THE EMBODIMENTS

Embodiments of the present invention are now described with reference to the accompanying drawings.

Referring now to FIGS. 1, 2, 3 and 11, a flat-type finger vein authentication device to which the present invention is applied and mounted in a notebook-type personal computer (PC) is described by way of example. Besides this, the present invention can be applied even to the vein authentication devices having the structures shown in FIGS. 4 and 5 and detailed description thereof will be made.

Figure 1:
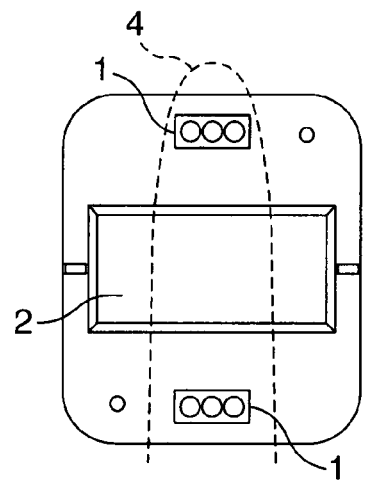
FIG. 1 is a top view showing a flat-type finger vein authentication device according to the present invention.
Figure 2:
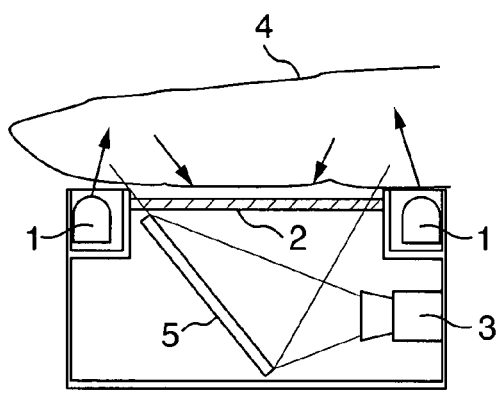
FIG. 2 is a sectional view showing the flat-type finger vein authentication device shown in FIG. 1.

The notebook-type personal computer includes the flat-type finger vein authentication device mounted in a palm rest part of the body thereof. FIG. 1 is a top view showing the external appearance of the flat-type finger vein authentication device. FIG. 2 is a diagram illustrating the state where a finger is put on the finger vein authentication device to image a vein pattern.

The finger vein authentication device includes near-infrared light emission parts 1 disposed in two places on the side of the finger cushion and near-infrared light from the near-infrared emission parts 1 enters the finger and is diffused within the finger. The finger vein authentication device images the diffused light emitted outside of the finger. At this time, emission amounts of the near-infrared light are different in vein parts and other parts except the vein parts due to difference of the absorption rate of the near-infrared light of blood. Thus, by imaging the near-infrared light, the vein pattern can be imaged.

FIG. 2 illustrates further detailed structure of the finger vein authentication device. When the finger 4 is put on the finger vein authentication device, the near-infrared light emission parts 1 are disposed in positions corresponding to upper and lower parts of the finger, that is, near the tip and the base of the finger. The near-infrared light emitted from the near-infrared light emission parts 1 impinges on to enter the finger and is diffused within the finger. The diffused light is emitted from the finger and enters a camera 3 through an imaging window 2 and a mirror 5. As described above, in order to image the vein pattern on the basis of the difference of the near-infrared light absorption rate of blood, the camera 3 having the high spectral sensitivity in the near-infrared light region is used or a filter which the near-infrared light passes through is disposed on the imaging window 2 to image the vein pattern.

Figure 3:
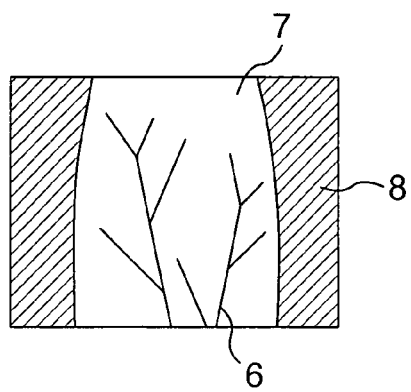
FIG. 3 shows an example of a normal finger vein pattern.

FIG. 3 is a diagram showing an example of the vein pattern of the finger imaged by the authentication device having the above structure. Part having the increased amount of near-infrared light is displayed white (bright). The vein part and the peripheral part 8 of the finger have the small amount of near-infrared light and accordingly these parts are imaged black (dark). Thus, the outline of the finger and the vein pattern within the finger can be recognized.

Figure 11:
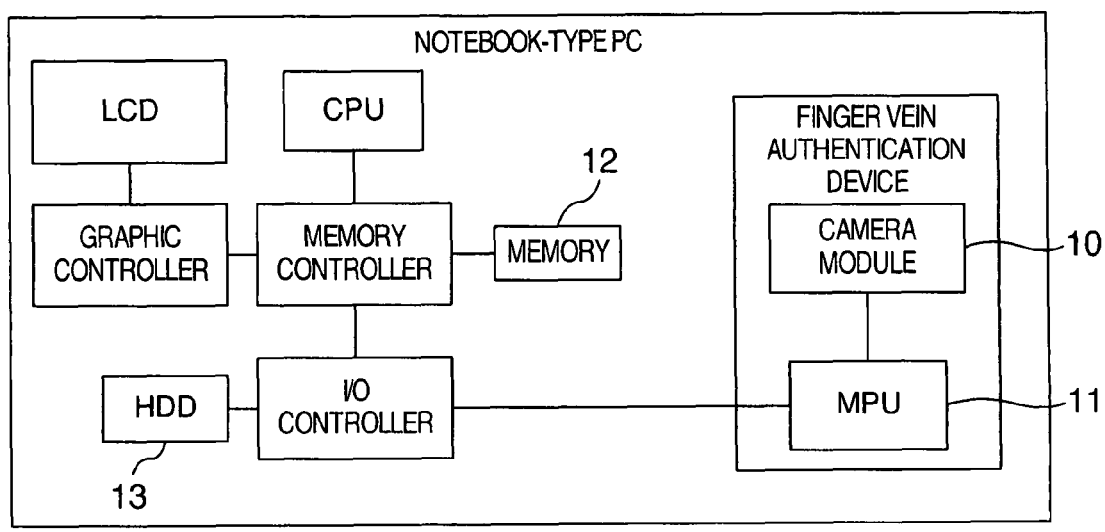
FIG. 11 is a control block diagram schematically illustrating a finger vein authentication device.

FIG. 11 is a block diagram illustrating the finger vein authentication device incorporated into a notebook-type personal computer (PC). The finger vein authentication device includes a camera module 10 that emits near-infrared light onto the finger to image the vein and an MPU (micro-processing unit) 11 that controls the camera module to send the imaged picture to the personal computer. Registration software of authentication data is executed on a memory 12 of the notebook-type personal computer to prepare an authentication template from the vein picture imaged by the finger vein authentication device and store it in a hard disk drive (HDD) 13. Similarly, authentication software is executed on the memory of the personal computer to prepare a collation template from the vein picture imaged by the finger vein authentication device and collate the collation template with the authentication template stored in the hard disk drive to make authentication.

The authentication template and the collation template constitute storage places of feature data extracted from the imaged vein pattern. The templates may be encrypted in order to enhance the secrecy. Authentication is judged on the basis of similarity of the authentication template data and the collation template data. Accordingly, a threshold for judgment is set, so that when the similarity of the templates is higher than the threshold, it is judged that the collation template coincides with the authentication template. The judgment threshold may be used as a parameter of the authentication software or may be stored in the hard disk drive similarly to the authentication template.

Figure 12:
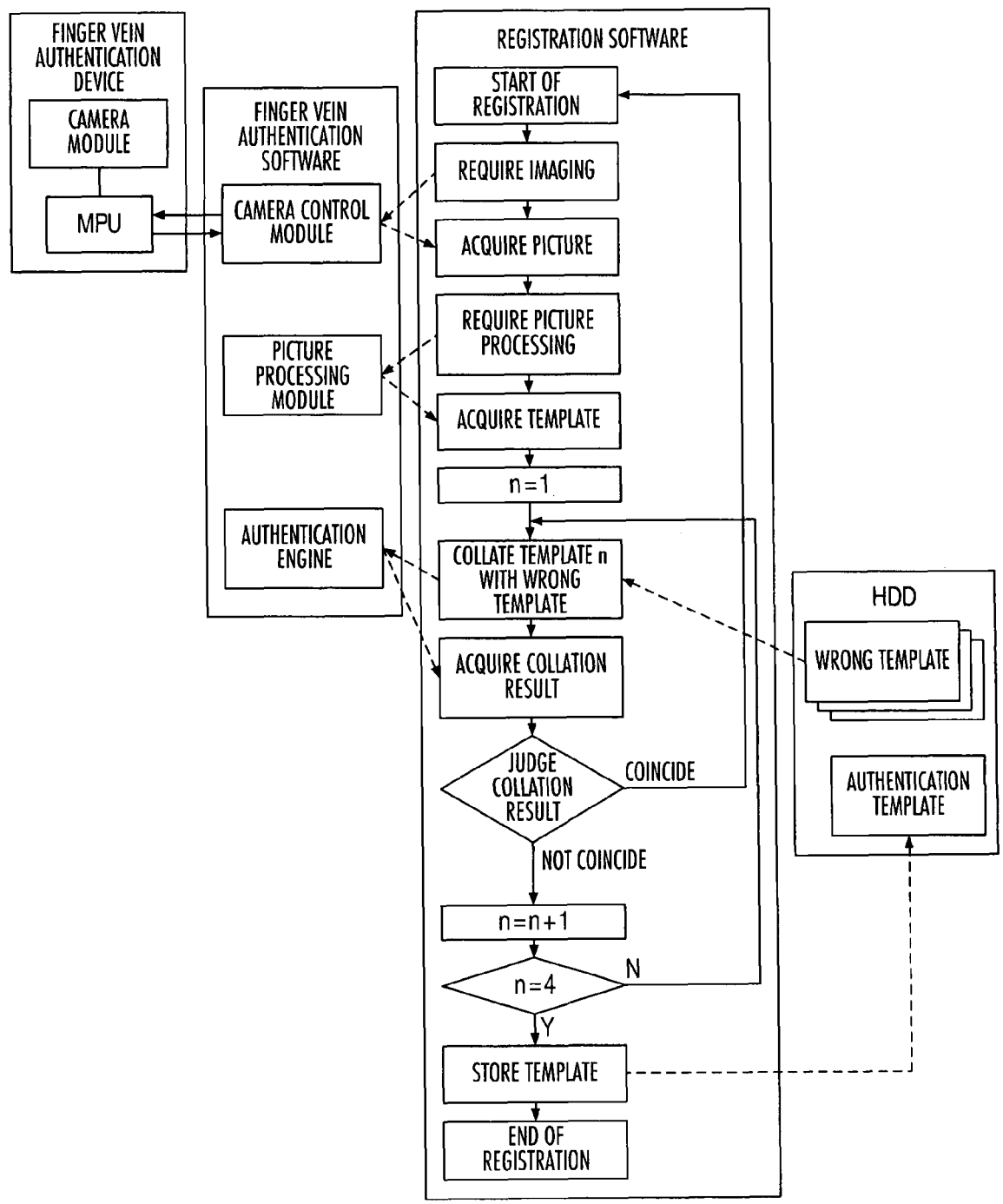
FIG. 12 is a diagram showing the whole structure of authentication processing software and an operation flow of registration performed by the software.

FIG. 12 shows the structure of registration software for the authentication template and an operation flow of registration performed by the software in the embodiment of the present invention. Vein authentication software is provided as an interface of the finger vein authentication device and the registration software that is higher-rank software. The vein authentication software includes a camera control module that is an interface with hardware and acquires a vein picture, a picture processing module for extracting only a vein pattern for authentication from the acquired vein picture and preparing a template from the extracted vein pattern and an authentication engine for comparing two templates to output a verification result of the coincidence degree as a numerical value (similarity).

The registration software requires the finger vein authentication software to image a vein pattern and acquires the vein pattern in order to prepare the authentication template. Then, the registration software sends the acquired picture to the finger vein authentication software, so that the picture processing module of the finger vein authentication software extracts the feature amount from the vein pattern to convert it into the collation template. This collation template is sent to the authentication engine of the finger vein authentication software together with a wrong template (described later) stored in the hard disk drive (HDD). The authentication engine collates the collation template with the wrong template to send the collation result to the registration software as a numerical value (similarity).

In the embodiment, it is supposed that the larger the numerical value (similarity) obtained as a result is, the more similar the templates are. The collation result is compared with a previously set threshold, so that when the collation result is smaller than the threshold, it is judged that the collation template does not coincide with the wrong template and the prepared template is stored in the hard disk drive as the authentication template. When the collation result is larger than the threshold, it is judged that the collation template coincides with the wrong template and the prepared template is discarded not to be stored in the hard disk drive as the authentication template.

The comparison of the collation template and the wrong template is repeated by the number of wrong templates stored in the hard disk drive and when the template produced by imaging of the vein pattern does not coincide with all of the wrong templates, the template is regarded as the authentication template. Since the wrong template is stored in the hard disk drive, the wrong pattern can be corrected and added to be suitable for the use surroundings easily.

As described above, since the authentication template is prepared by collation with the previously stored wrong template, the authentication template is not prepared unconditionally even if operation is made in the surroundings described below and accordingly the authentication template with high accuracy can be registered.

Figure 6:
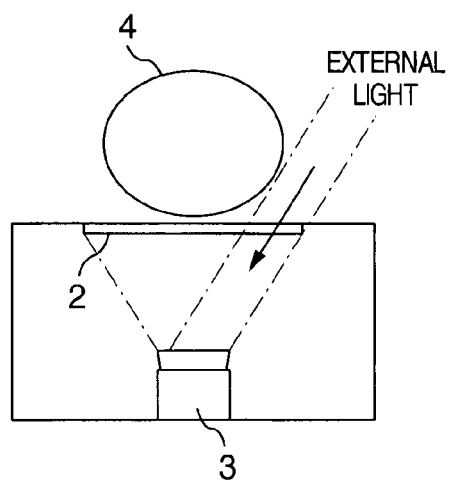

First, an example of the wrong template in the surroundings where external light streams in through an imaging window is described. FIG. 6 shows a cross section of the finger vein authentication device on which a finger is put, the cross section being taken in the direction perpendicular to the longitudinal direction of a finger. In FIG. 6, external light streams in through the imaging window 2 disposed on the side of the finger 4. In the bright place in direct sunshine, near-infrared light contained in the external light directly enters the camera to form the backlight state, so that a picture becomes dark due to the exposure correction function of the camera. Accordingly, there is a possibility that the finger that is an object to be taken is imaged dark as shown in FIG. 7 and the vein is not imaged in the picture.

The device in which the template prepared from such a picture is registered is used to make authentication in the state where direct sunshine streams in from between the imaging window 2 and the finger 4 in the bright place similarly to the above. In such a case, even when a finger of another person except the person who has registered the template is put on the device, the finger is imaged dark as a whole similarly to imaging in the registration and accordingly the possibility that the imaged dark picture is judged to have the same pattern as the registered pattern is increased. In other words, when the template is registered in the state where direct sunshine streams in from between the imaging window 2 and the finger 4 in the bright place, there is a possibility that the acceptance rate of others is increased.

Figure 7:
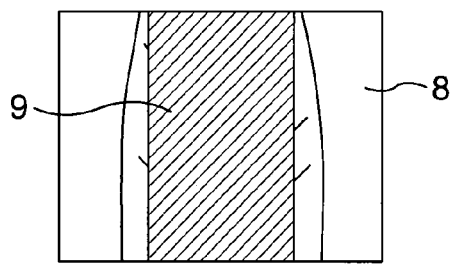
FIG. 7 is a diagram illustrating a finger vein pattern in case where influence of external light is exerted.

In order to prevent such a problem, a template corresponding to the vein pattern as shown in FIG. 7 is previously acquired to store it in the hard disk drive as a wrong template 1. Further, as described above, the authentication template is not produced in such surroundings.

Figure 8:
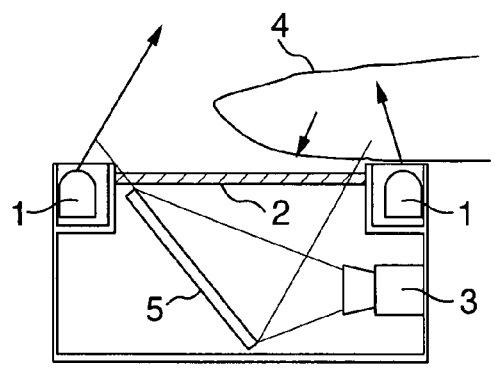
FIG. 8 is a schematic diagram illustrating an imaging situation in case where a finger is put incorrectly.
Figure 9:
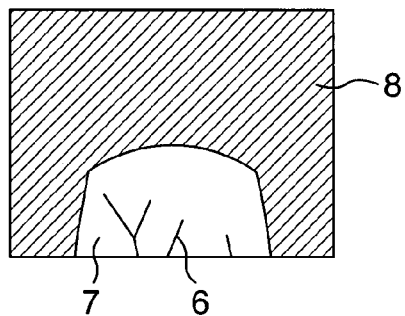
FIG. 9 is a diagram illustrating a finger vein pattern in case where a finger is put incorrectly.

Next, an example of another wrong template is described. FIG. 8 shows the vein authentication device on which a finger is put incorrectly. The vein authentication device of the embodiment includes two near-infrared light emission parts 1 disposed in positions corresponding to upper and lower parts of the finger, that is, near the tip and the base of the finger and the vein pattern of the finger between the two near-infrared light emission parts 1 is detected by diffused light of the near-infrared light emitted by the near-infrared light emission parts 1. Accordingly, when the finger is put only on one near-infrared light emission part 1 as shown in FIG. 8, the vein pattern is imaged as shown in FIG. 9. Even when a template is prepared from the vein pattern as shown in FIG. 9, the template has reduced feature information of the vein pattern and is unsuitable as the authentication template.

Even when a finger is put only on the near-infrared light emission part 1 disposed on the tip side of the finger, the put position of the finger is incorrect similarly.

In order to prevent the finger from being put incorrectly, the template corresponding to the vein pattern acquired in the state as shown in FIG. 6 is previously acquired to store it in the hard disk drive as the wrong template 2. Further, as described above, the authentication template is not produced in such surroundings.

Figure 10:
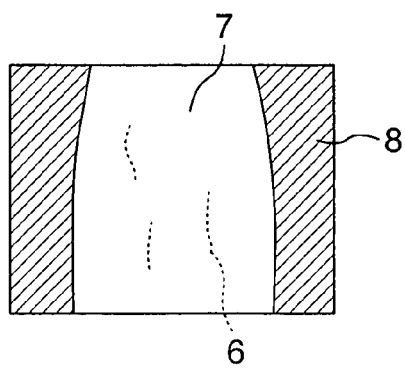
FIG. 10 is a diagram illustrating a finger vein pattern in case where vein is not almost imaged.

Moreover, when the vein of the finger is narrow or fine and is difficult to see or when the vein is not almost imaged for some reason, the vein pattern is thin as shown in FIG. 10 and only the outline of the finger is imaged virtually. Even when the template is prepared from such vein pattern, the template has reduced feature information of the vein pattern and is unsuitable as the authentication template. The template prepared from such a picture is stored in the memory as the wrong template 3.

In the description of the embodiment, the collation template is collated with the previously registered wrong template by the registration program of the authentication template, so that it is not registered as the authentication template in the use surroundings and operation unsuitable for registration of the template. The processing for collating the wrong template with the template of the imaged vein pattern can be applied even to the authentication program. Detailed description thereof is made with reference to FIG. 13.

Figure 13:
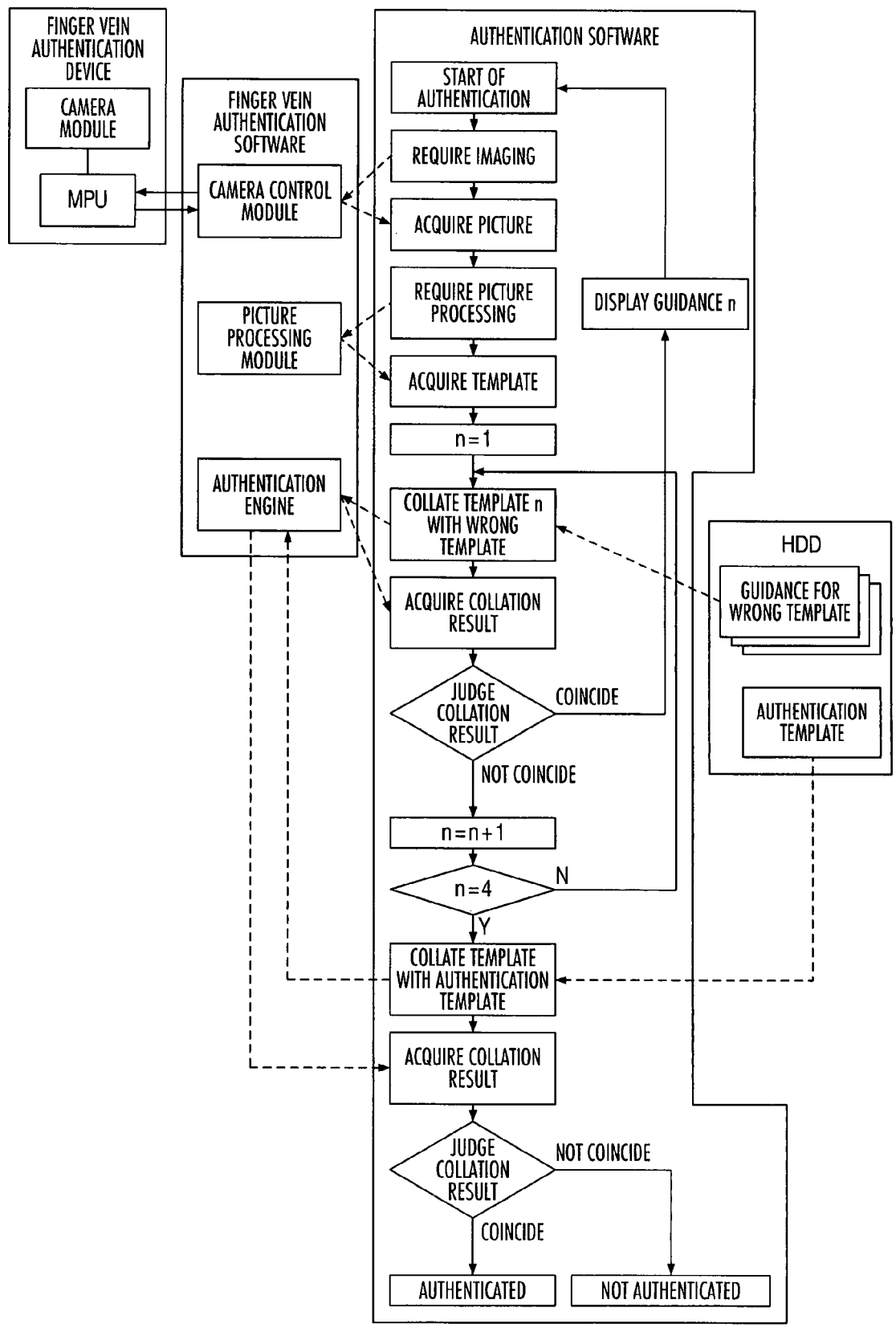
FIG. 13 is a diagram showing the whole structure of authentication processing software and an operation flow of authentication performed by the software.

The structure of the finger vein authentication device and the finger vein authentication software shown in FIG. 13 is the same as the registration program described in FIG. 12 and accordingly description thereof is omitted.

In order to authenticate the user, the authentication program requires the finger vein authentication software to image a vein pattern and acquires the vein pattern. Then, the authentication software sends the acquired picture to the finger vein authentication software, so that the picture processing module of the finger vein authentication software extracts the feature amount from the vein pattern to convert it into the collation template. This template is sent to the authentication engine of the finger vein authentication software together with the wrong template stored in the hard disk drive. The authentication engine collates the collation template with the wrong template to send the collation result to the authentication software as a numerical value (similarity). The collation of the template is repeated by the number of wrong templates stored in the hard disk drive.

When the similarity is high and it is judged that the collation template coincides with the wrong template, it is the case where the finger vein pattern unsuitable for authentication is imaged and accordingly the guidance for solving the problem is displayed to the user and the authentication program is re-started to image the finger vein pattern.

In order to display the guidance, guidance messages are prepared according to kinds of the wrong templates and are stored in the hard disk drive in a corresponding manner to the wrong templates. For example, the guidance message of "Surroundings are too bright. Shield authentication device from light" is prepared for the wrong template 1, the guidance message of "Put finger correctly" for the wrong template 2 and the guidance message of "Cannot acquire authentication information. Retry authentication" for the wrong template 3.

When the similarity is low and it is judged that the collation template does not coincide with the wrong template, it is the case where the collation template is that acquired when the vein pattern suitable for authentication can be imaged and the authentication program sends the collation template and the authentication template stored in the hard disk drive to the authentication engine of the finger vein software. The authentication engine collates the collation template with the authentication template and sends its collation result to the authentication software as a numerical value (similarity).

When the similarity of the collation template and the authentication template is higher than the judgment threshold, it is judged that the collation template and the authentication template coincide with each other, so that the user of the finger vein authentication device is authenticated. When the similarity of the collation template and the authentication template is lower than the judgment threshold, it is judged that the collation template and the authentication template do not coincide with each other, so that the user of the finger vein authentication device is not authenticated.

According to the embodiment, since the authentication template and the wrong template are stored, authentication of the user and the availability of the vein pattern can be judged by the same authentication engine and accordingly the processing program can be made efficient.

Further, it is desired that there are provided the judgment threshold for similarity of the collation template and the authentication template upon authentication and the judgment threshold for similarity of the collation template and the wrong template upon pattern check individually and the judgment threshold upon pattern check is set to be smaller than the judgment threshold upon authentication. Consequently, the vein pattern unsuitable for the authentication template can be discarded over the wide range upon registration of the authentication template, so that the authentication rate can be improved.

Next, description is made to the embodiment in which the present invention is used when the timing of imaging the finger vein pattern in the finger vein authentication device is decided.

In order to image the finger vein pattern finely, it is necessary to image the near-infrared light diffused in the finger and passing through the finger. Accordingly, when the finger is separated from light emitting diodes (LED), so that the near-infrared light cannot be diffused into the finger sufficiently or when the near-infrared light (external light) entering from the periphery except the near-infrared light emitted from the finger is increased, the finger vein pattern cannot be imaged finely. Accordingly, it is desired that when the finger vein pattern is imaged for the purpose of registration of the finger vein pattern and authentication of the finger, it is examined whether the situation that the finger vein pattern can be imaged satisfactorily is arranged or not and when it is not arranged, it is notified to the user.

Figure 14A:
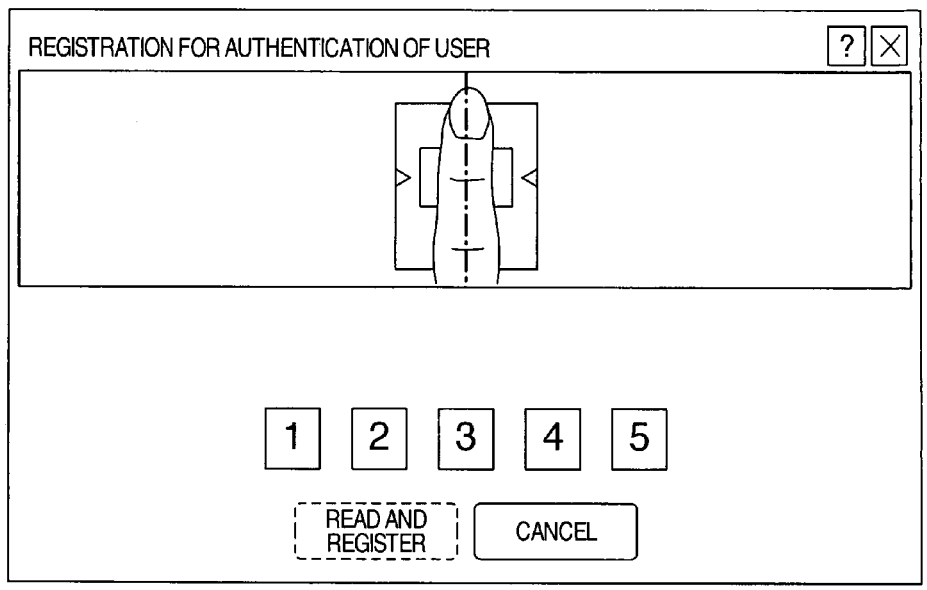
FIGS. 14A and 14B are diagrams showing examples of pictures displayed by a personal computer (PC) in case where a registration program is executed.
Figure 14B:
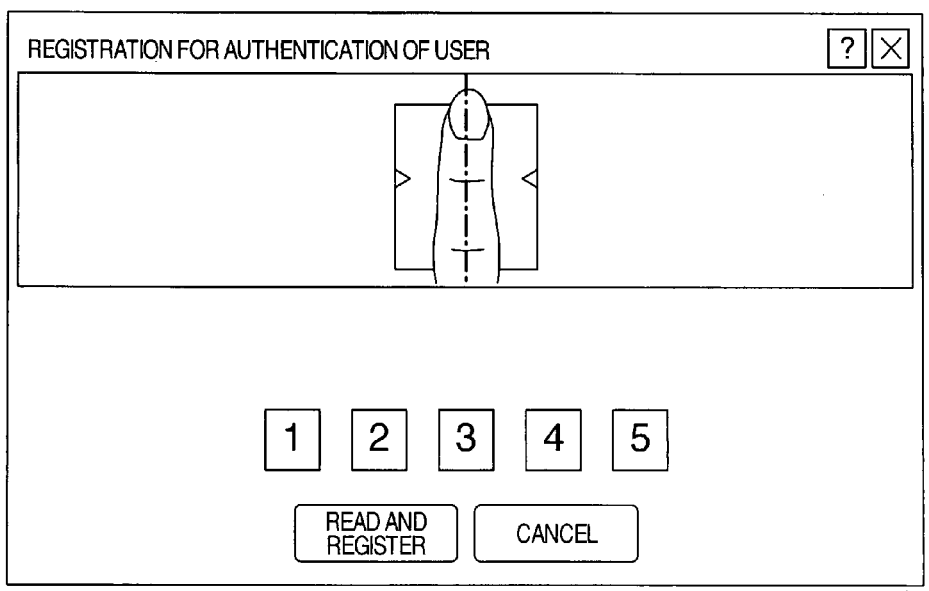

FIGS. 14A and 14B show pictures displayed by the personal computer for notifying the situation that the finger vein pattern cannot be imaged satisfactorily to the user when the finger vein pattern is registered in the embodiment. When the finger is not put on the finger vein authentication device suitably or correctly, a registration button is set not to be able to be depressed as shown in FIG. 14A, so that it is notified to the user that the situation that the finger vein pattern can be imaged satisfactorily is not arranged. When the finger is put on the finger vein authentication device suitably, the registration button is set to be able to be depressed as shown in FIG. 14B, so that it is notified to the user that the situation that the finger vein pattern can be imaged satisfactorily is arranged.

Figure 5:
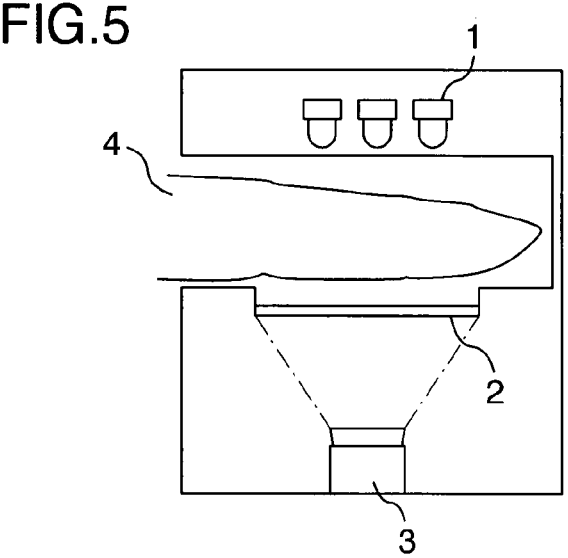
FIG. 5 is a sectional view illustrating structure of a finger vein authentication device of an upper emission type.

Referring now to FIG. 5, the registration procedure of the finger vein pattern to which an operation flow for confirming whether the finger is put suitably or not is added is described. In step ST01, the registration button is set not to be displayed.

In step ST02, in order to confirm whether the finger is put on the finger vein authentication device suitably, imaging for confirmation of the finger put state is made. In the imaging for confirmation of the finger put state, it is enough just to judge that the finger is put on the device and accordingly the accuracy necessary for imaging of the vein pattern is not required. Rather, it is preceded that imaging can be made several times per second.

In step ST03, the pattern imaged for confirmation of the finger put state is analyzed to judge whether the finger is put suitably or not.

Figure 16:
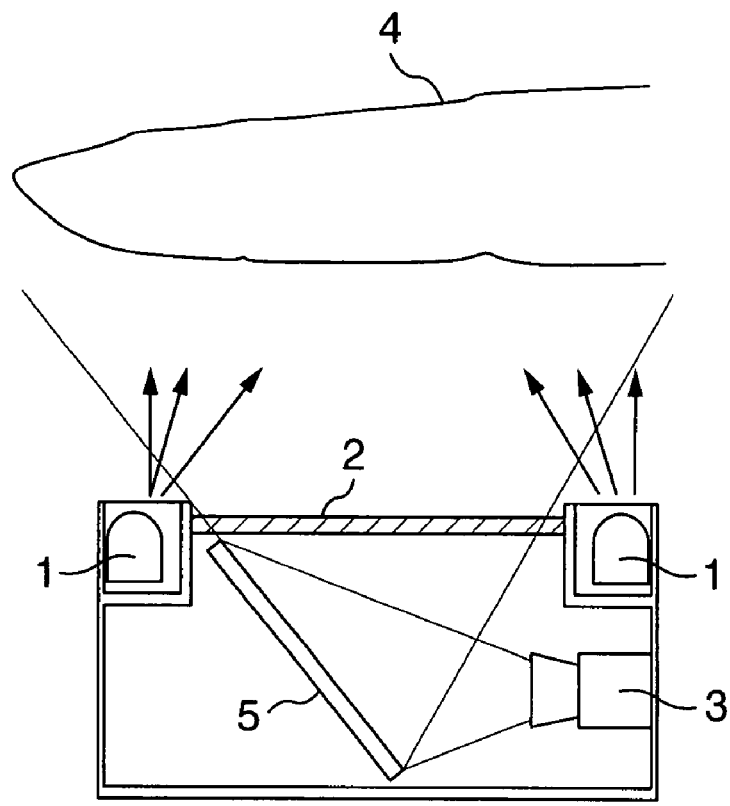
FIG. 16 is a schematic diagram illustrating an imaging situation when a finger is separated from the finger vein authentication device.
Figure 17:
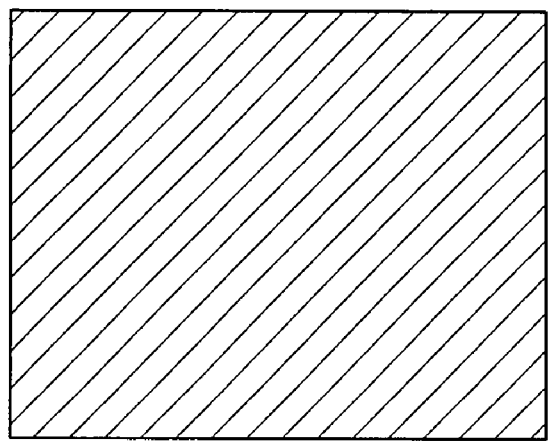
FIG. 17 is a diagram illustrating a finger vein pattern when a finger is separated from the finger vein authentication device.

As shown in FIG. 16, when the finger is separated from the finger vein authentication device, there is no near-infrared light diffused within the finger and passing through the finger and accordingly a uniformly dark picture is obtained as a whole as shown in FIG. 17. Further, when the tip or part of the finger is separated from the device, the near-infrared light diffused within the finger and passing through the finger is acquired only partially and accordingly a picture as shown in FIG. 9 is acquired.

Since it can be judged that the finger is not put suitably in case of the patterns as shown in FIGS. 17 and 9, such several kinds of wrong patterns are used to judge that the finger is not put suitably when the imaged vein pattern coincides with the wrong pattern, so that it can be confirmed that the finger is not put suitably. When the judgment result is negative (unsuitable), the processing proceeds to step ST05, in which a picture is displayed so that the registration button cannot be depressed as shown in FIG. 14A and the processing is returned to step ST02 in order to reconfirm the finger put state. When the judgment result is suitable, the processing proceeds to step ST04, in which a picture is displayed so that the registration button can be depressed as shown in FIG. 14B and it is confirmed in step ST06 whether the registration button is depressed or not.

When the registration button is not depressed, it is necessary to confirm that the finger is not separated. Accordingly, in order to reconfirm the finger put state, the processing is returned to step ST02. When the registration button is depressed, imaging for registration of the finger vein pattern is performed in step ST07.

In the imaging for registration of the finger vein pattern, the imaging is performed several times while adjusting the intensity of light emitted by light emitting diodes. It is judged whether the picture imaged in the method described above is suitable for registration as the finger vein pattern in step ST08 and when it is judged to be unsuitable, a message for notifying that it is an unsuitable picture for registration is displayed in step ST10 and the processing is returned to step ST02 in which the finger put state is reconfirmed. When it is judged that the picture is unsuitable for registration as the finger vein pattern, it is registered as the authentication pattern in step ST09.

Figure 18:
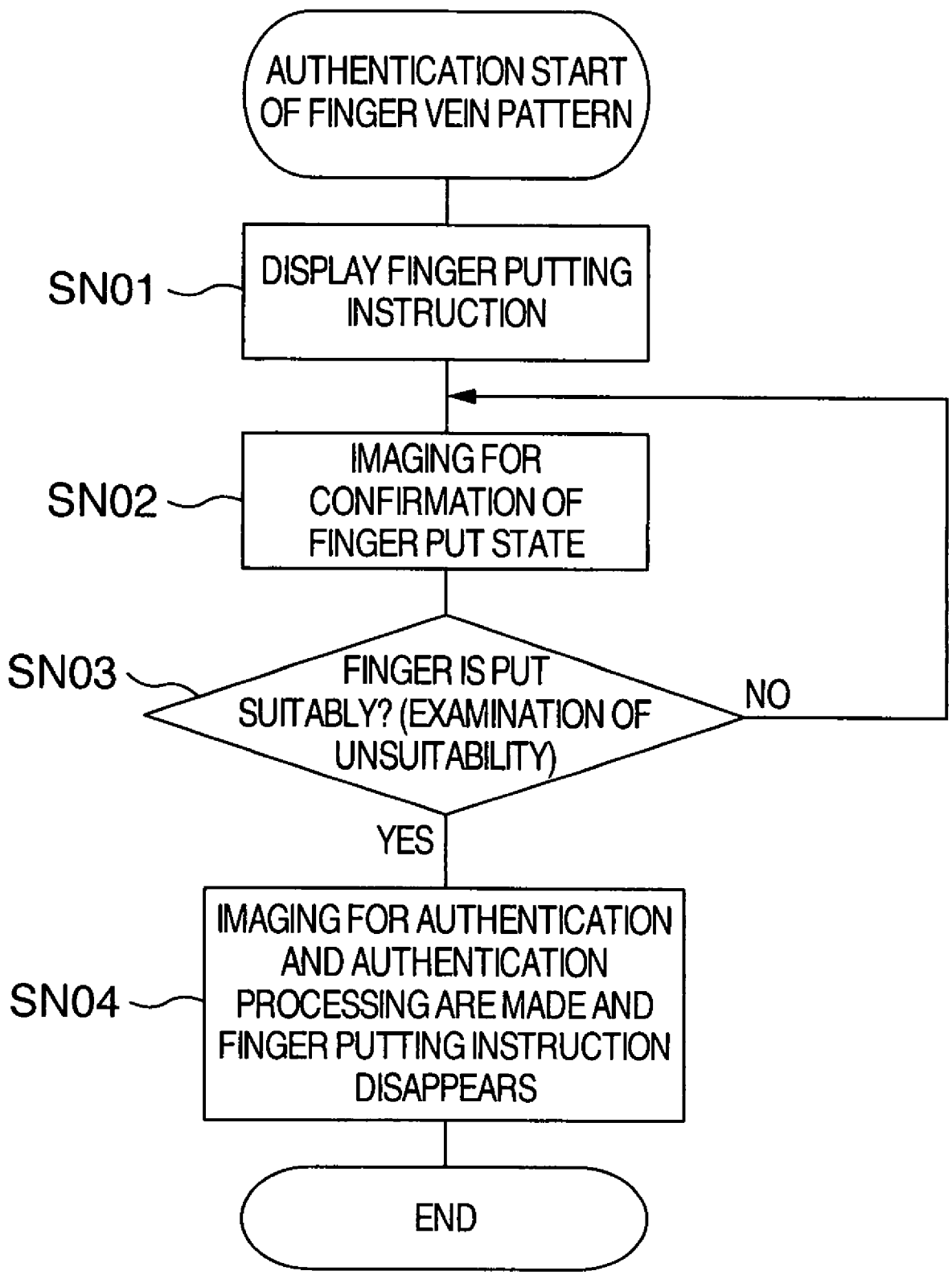
FIG. 18 is a flow chart showing the operation procedure of an authentication program for displaying a finger putting indication.

Referring now to FIG. 18, the finger vein authentication procedure to which an operation flow for confirming whether the finger is put suitably or not is added is described. In step SN01, a message is displayed to urge the user to put the finger on the finger vein authentication device.

Figure 15:
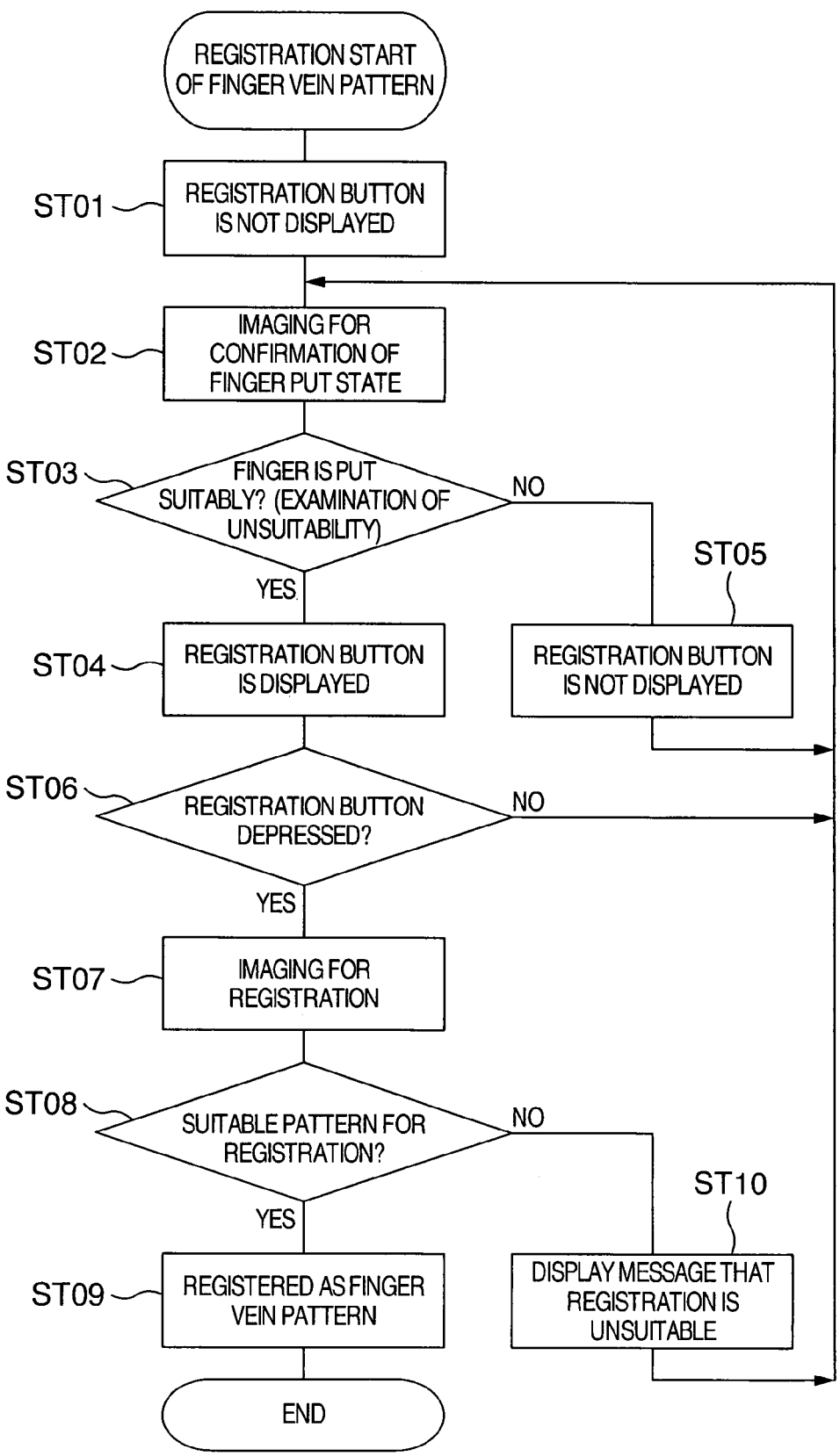
FIG. 15 is a flow chart showing the operation procedure of the registration program for displaying a registration button and disappearing it.

In steps SN02 and SN03, the same operation as in registration is made (steps ST02 and ST03 of FIG. 15). In step SN02, imaging for confirmation of the finger put state is made in order to confirm whether the finger is put on the finger vein authentication device suitably. In step SN03, the pattern imaged for confirmation of the finger put state is analyzed to judge whether the finger is put suitably or not.

When the judgment result is negative (unsuitable), the processing is returned to step SN02 in order to reconfirm whether the finger is put on the finger vein authentication device suitably or not. When the judgment result is suitable, the processing proceeds to step SN04, in which imaging for authentication is made and authentication processing is made by the method described in the embodiments 1 to 3. At the same time, the message displayed in step SN01 disappears.

The registration processing of the finger vein pattern can be made in the same processing procedure as the authentication processing of FIG. 18 without using the registration button. That is, the registration processing may be made by changing the processing in step SN04 of FIG. 18 to the imaging for registration, the registration processing and disappearance of the finger putting instruction.

Figure 4:
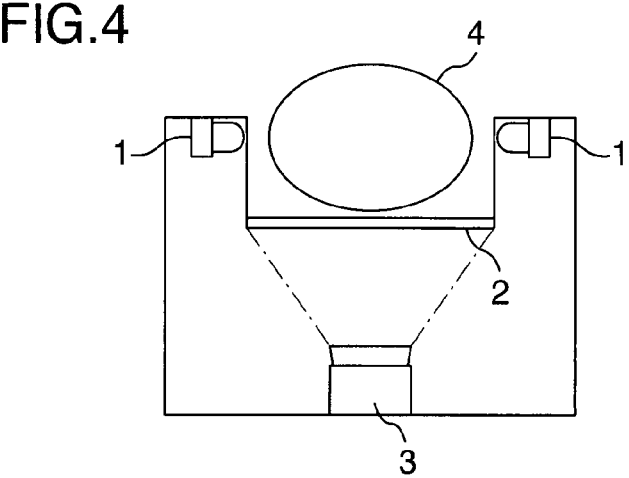
FIG. 4 is a sectional view illustrating structure of a finger vein authentication device of a side emission type.

In the embodiment, the finger vein authentication device of the flat type in which near-infrared light enters the finger from two parts on the finger cushion side thereof and the near-infrared light diffused within the finger is imaged from the finger cushion side has been described, although the finger vein authentication device may be of the side incident type in which near-infrared light enters the finger from the sides thereof as shown in FIG. 4 and the near-infrared light diffused within the finger is imaged from the finger cushion side or of the upper incident type in which near-infrared light enters the finger from the back of the finger as shown in FIG. 5 and the near-infrared light passing through the finger is imaged from the finger cushion side.

The present invention can be applied even to the finger vein authentication device of these types. When the present invention is applied to the finger vein authentication device of the side incident type shown in FIG. 4, the device can utilize the wrong templates 1 to 3. Further, the finger vein authentication device of the upper incident type shown in FIG. 5 can utilize the wrong templates 2 and 3 since the vein pattern discarded by the wrong template 1 is not imaged due to the structure for cutting off external light.

Further, the present invention is not limited to the finger vein authentication device and can apply to the authentication device that makes authentication using the vein pattern of another part. In addition, the present invention can apply to the authentication device using biometric information except the vein pattern.

The invention claimed is:

1. A biometric authentication device for making authentication by pattern comparison of biometric pattern information, comprising:
    a memory storing an authentication template for registering features of biometric pattern information of a person to be authenticated, a collation template for recording features of biometric pattern information of the person to be authenticated acquired upon authentication, and a wrong template for registering features of biometric pattern information acquired on unsuitable condition;
    a collation part for making first template collation in which the collation template is data-compared with the wrong template and second template collation in which the collation template is data-compared with the authentication template; and
    an authentication control part for authenticating a user in accordance with collation results of the first template collation and the second template collation.

2. A biometric authentication device according to claim 1, wherein the authentication control part controls the collation part to make the second template collation when similarity in the first template collation is low.

3. A biometric authentication device according to claim 1, further comprising display means for urging the person to be authenticated to input biometric pattern information
    and wherein
    the authentication control part instructs the person to be authenticated to input the biometric pattern information by means of the display means when similarity in the first template collation is high and makes the input instruction by the display means disappear when similarity in the first template collation is low.

4. A biometric authentication device according to claim 1, wherein the wrong template has a plurality of patterns and
    the authentication control part controls the collation part to make collation using the patterns of the wrong template successively and to make the second template collation when similarity in the first template collation is low in all of the patterns.

5. A biometric authentication device according to claim 4, wherein the wrong template contains any of template information in case of imaging condition that external light streams in or in case where a biometric information acquirement position is unsuitable or in case where there are not many features of pattern information.

6. A biometric authentication device according to claim 5, comprising guidance display means for notifying a solution method of problem to a user
    and wherein
    the authentication control part displays, when similarity in the first template collation is high, the solution method of problem by means of the guidance display means in accordance with a pattern of the wrong template having the high similarity.

7. A biometric authentication device for making authentication by pattern comparison of biometric pattern information, comprising:
    a memory storing an authentication template for registering features of biometric pattern information of a person to be authenticated, a collation template for recording features of biometric pattern information of the person to be authenticated acquired upon authentication, and a wrong template for registering features of biometric pattern information acquired on unsuitable condition;
    a template collation part for data-comparing the collation template with the wrong template; and
    an authentication information registration part for, when similarity in the template collation part is low, recording the collation template as the authentication template.

8. A biometric authentication device according to claim 7, wherein the wrong template has a plurality of patterns and
the authentication information registration part makes collation using patterns of the wrong template by means of the template collation part successively and records the collation template as the authentication template when similarity in the template collation is low in all of the patterns.

9. A biometric authentication device according to claim 8, wherein the wrong template contains any of template information in case of imaging condition that external light streams in or in case where a biometric information acquirement position is unsuitable or in case where there are not many features of pattern information.

10. A biometric authentication device according to claim 9, comprising guidance display means for notifying a solution method of problem to a user
and wherein
the authentication control part displays, when similarity in the template collation is high, the solution method of problem by means of the guidance display means in accordance with a pattern of the wrong template having the high similarity.

11. A biometric authentication device according to claim 7, wherein the template collation part includes a user authentication part for data-comparing the collation template with the authentication template and authenticating a user as a registered user when similarity of the collation template and the authentication template is high, and
judgment of similarity of the collation pattern and the wrong pattern is made on the basis of different thresholds in cases where the authentication template is registered and where the user authentication is made.

12. A biometric authentication device according to claim 11, wherein the threshold for judgment of similarity of the collation pattern and the wrong pattern in the case where the authentication template is registered is lower than that in the case where the user authentication is made.

13. An authentication method of making authentication by pattern comparison of biometric pattern information, comprising a computer performing:
a step of acquiring biometric pattern information of a person to be authenticated and recording a pattern indicative of features of the biometric pattern in a collation template in order to register the person;
a step of data-comparing a wrong template in which features of biometric pattern information acquired on unsuitable condition are registered with the collation template; and
a step of registering data of the collation template in the authentication template in which features of the biometric pattern information of the person are recorded when similarity of the wrong template and the collation template is low.

14. An authentication method according to claim 13, wherein the wrong template has a plurality of patterns and further comprising:
the computer data-comparing the collation template with the wrong template successively; and
the computer registering data of the collation template in the authentication template in which the features of the biometric pattern information of the person are recorded when similarity of the collation template and all the patterns of the wrong template is low.

15. An authentication method according to claim 14, further comprising:
the computer displaying, when similarity of the collation template and the pattern of the wrong template is high, a solution method of a problem in accordance with the pattern of the wrong template having high similarity.

16. An authentication method according to claim 13, further comprising the computer performing:
a step of acquiring biometric pattern information of the person and recording a pattern indicative of feature of the biometric pattern in the collation template in order to authenticate the person;
a step of data-comparing the collation template with the wrong template in which features of the biometric pattern information acquired on unsuitable condition are registered;
a step of data-comparing the collation template with the authentication template in which features of the biometric pattern information of the person are registered when similarity of the wrong template and the collation template is low; and
a step of regarding authentication as successful when similarity of the authentication template and the collation template is high.

17. An authentication method according to claim 16, wherein the wrong template has a plurality of patterns and further comprising:
the computer data-comparing the collation template with the wrong template successively; and
the computer data-comparing the authentication template with the collation template when similarity of the collation template and all the patterns of the wrong template is low.

18. An authentication method according to claim 17, further comprising:
the computer displaying, when similarity of the collation template and the pattern of the wrong template is high, a solution method of a problem in accordance with the pattern of the wrong template having high similarity.

19. An authentication method according to claim 16, wherein a threshold for judgment of similarity of the collation template and the wrong template when person to be authenticated is registered is lower than that when the person is authenticated.

20. An authentication method according to claim 16, further comprising the computer instructing to input the biometric pattern information again when similarity of the wrong template and the collation template is high upon judgment of similarity of the wrong template and the collation template when the person is registered and upon judgment of similarity of the wrong template and the collation template when the person is authenticated.

* * * * *